United States Patent [19]
Harned

[11] 3,963,010
[45] June 15, 1976

[54] ENGINE WITH FAST WARM UP HEAT PIPE MIXTURE HEATING

[75] Inventor: John L. Harned, Grosse Pointe Woods, Mich.

[73] Assignee: General Motors Corporation, Detroit, Mich.

[22] Filed: June 30, 1975

[21] Appl. No.: 591,275

[52] U.S. Cl. ..................... 123/122 AC; 123/122 H; 165/105
[51] Int. Cl.² ....................................... F02M 31/00
[58] Field of Search ............... 123/122 AC, 122 AB, 123/122 R, 122 AA, 122 A; 165/105, 52; 261/144, 145, DIG. 55, DIG. 21

[56] References Cited
UNITED STATES PATENTS

| | | | |
|---|---|---|---|
| 1,437,395 | 12/1922 | Brush | 123/122 AC |
| 3,763,838 | 10/1973 | Lindsay | 123/133 |
| 3,858,564 | 1/1975 | Beatenbough | 123/122 AC |

*Primary Examiner*—Charles J. Myhre
*Assistant Examiner*—R. H. Lazarus
*Attorney, Agent, or Firm*—Robert J. Outland

[57] ABSTRACT

An internal combustion engine induction system is provided with a heat pipe arrangement having fast warm up and automatic temperature control characteristics to quickly apply exhaust heat to the inlet mixture during warm up while controlling the maximum heat applied at a predetermined level.

5 Claims, 8 Drawing Figures

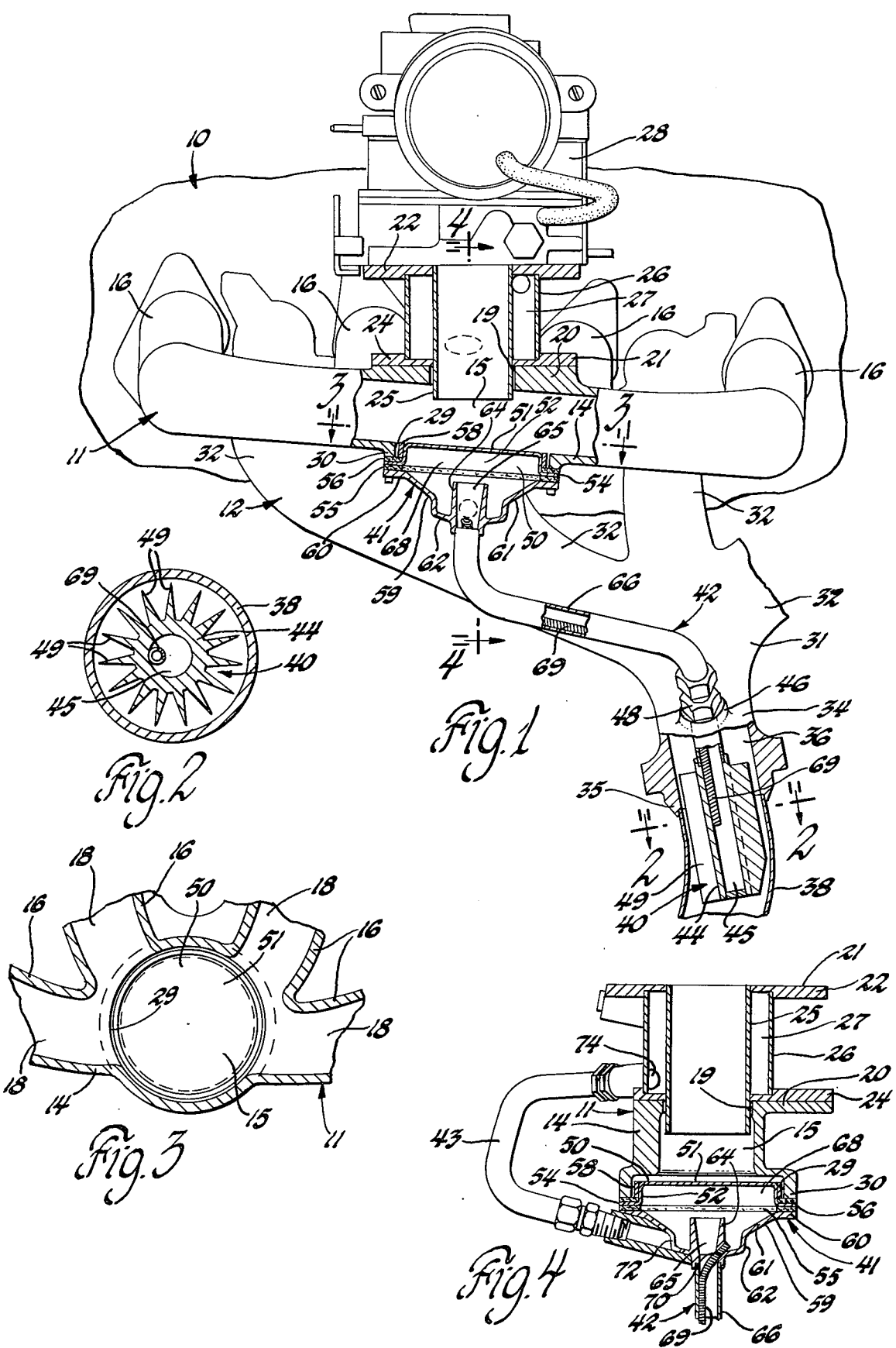

ENGINE WITH FAST WARM UP HEAT PIPE MIXTURE HEATING

FIELD OF THE INVENTION

This invention relates to intake mixture heating systems for internal combustion engines and more particularly to systems wherein heat is transferred from the exhaust gases to the inlet mixture by means of heat pipe arrangements having quick warm up and automatic temperature control characteristics.

BACKGROUND OF THE INVENTION

It is a well known practice in the field of spark ignited gasoline engines, particularly those for automotive use, to provide means for heating the intake air-fuel mixture with heat transferred from the engine exhaust gases. Systems of this sort are primarily used to provide heat for vaporizing the fuel during the engine warm up period when the intake manifold is cold, the amount of heat applied being reduced or cut off completely after the engine has been fully warmed up to normal temperatures.

Such systems generally utilize juxtaposed manifold arrangements or interrelated passages wherein exhaust gases are directed against a plate or wall to which the intake manifold mixture is exposed, preferably at a point below the carburetor throat or inlet passage. The heating of the plate or wall by exhaust gases vaporizes fuel droplets impinging on the wall or plate and heats the adjacent air-fuel mixture. To control systems of this type generally requires a valve mechanically actuated by a thermostatic device or time controlled mechanism of some sort, adding complexity to the systems.

To overcome some of the problems inherent in mechanical valve systems, it has been proposed to use two-phase thermosyphons, more recently known as heat pipes, in which a vaporizable fluid is utilized to transfer heat from the exhaust gases to a fuel vaporizing chamber. The proposed systems have, however, involved relatively complex arrangements for vaporizing the fuel in advance of mixing with the main air charge and appear not to satisfy the desired requirements of simplicity and practicality, while also meeting the needs of fast warm up and automatic temperature limitation required of such systems.

SUMMARY OF THE INVENTION

The present invention provides novel applications of the heat pipe concept to the problem of mixture heating in internal combustion engines which meet the stated requirements. The invention utilizes relative simple boiler and condenser structures connected by a heat pipe without any moving part, other than the vaporizable heat transfer fluid itself. The arrangements are applicable to physically separated intake and exhaust manifolds of more or less conventional construction with minor modifications.

Fast warm up of such heat pipe systems is provided by limiting the volume of the heat transfer fluid to be heated and providing a heat plate in the intake manifold of minimum mass and preferably insulated from the intake manifold walls. Control of maximum temperatures is obtained by proper selection of a heat transfer fluid, limiting of the fluid mass within the system charging the system with a preselected inert gas mass, and provision of means to control the rate of fluid return to the boiler, when necessary.

Various additional features and advantages of the invention in its various forms will be more fully understood from the following description of certain preferred embodiments taken together with the accompanying drawings.

BRIEF DESCRIPTION OF THE DRAWINGS

In the drawings:

FIG. 1 is a side view of an internal combustion engine illustrating the intake and exhaust manifolds to which are applied a heat pipe mixture heat system in accordance with the invention;

FIG. 2 is a cross-sectional view through the exhaust conduit and boiler of the heat pipe system taken in the plane indicated by line 2—2 of FIG. 1;

FIG. 3 is a cross-sectional view within the exhaust manifold looking downwardly on the heat plate from the plane indicated by the line 3—3 of FIG. 1;

FIG. 4 is a cross-sectional view through the intake manifold showing details of the mixture heating portions of the arrangement as viewed in the direction of the arrows from the plane indicated by the line 4—4 of FIG. 1;

GENERAL DESCRIPTION

Figure 5:
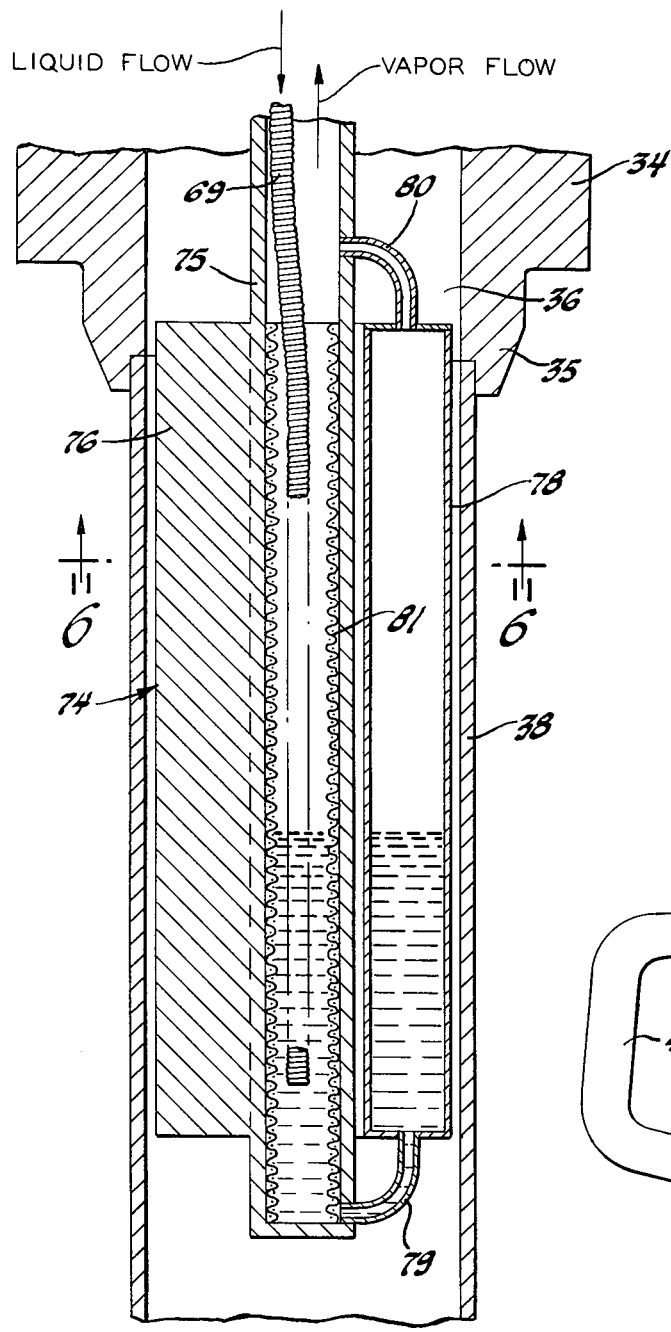
FIG. 5 is an enlarged cross-sectional view showing an alternative embodiment of boiler incorporating a liquid storage tank spaced from the main boiler housing.

Referring first to FIGS. 1–4 of the drawings, there is shown an internal combustion engine generally indicated by numeral 10. Although not shown in detail, the engine may be considered to be of the well known four cylinder inline type. Engine 10 is provided with an intake manifold 11 and an exhaust manifold 12 which are separately formed and connected with the usual combustion chamber intake and exhaust ports, not shown.

Intake manifold 11 comprises a cast member 14 having a generally horizontal central plenum 15 from which extend four individual legs 16 defining, internally mixture passages 18 connecting with the individual intake ports, not shown. Above the plenum 15, there is provided an inlet opening 19 centered in a mounting boss 20 on which is mounted a riser assembly 21.

The riser assembly includes upper and lower flanges 22, 24, respectively, interconnected by a riser tube 25 that extends below the lower flange and through the inlet opening 19 of the manifold 11. The riser tube is formed of thin wall heat conducting material such as aluminum, stainless steel or the like that is sealingly connected to the flanges at joints of minimum cross section to minimize heat transfer. The riser tube is surrounded, intermediate the flanges, by an outer tube 26 that defines a sealed annular jacket 27 surrounding the tube 25 for purposes to be subsequently described.

A carburetor 28 is mounted on the upper flange 22 and arranged to provide mixtures of air and fuel in combustible porportions to the riser tube for passage therethrough to the manifold inlet mixture plenum 15 and passages 18 for delivery to the engine combustion chambers, not shown. In the bottom wall of the cast manifold body 14 there is provided an opening 29 surrounded by a mounting flange 30 and disposed below the plenum 15 and riser tube 25 for purposes to be subsequently described.

The exhaust manifold 12 is formed by a cast body 31 that includes four legs 32 defining, internally exhaust passages, not shown, and connecting at their ends with the engine exhaust ports, not shown. The exhaust legs 32 join at a main body portion 34 which terminates at a flange connection 35 and defines a common exhaust passage 36 through which the exhaust gases from all the cylinders pass. An exhaust pipe 38 is connected to the manifold flange connection 35 by suitable means, not shown, and defines an extension of the exhaust passage 36.

In order to provide for the transmission of exhaust heat from the gases in the exhaust manifold to the fuel and air mixture in the inlet manifold, the engine is provided with a heat pipe mixture heating system comprising generally a boiler assembly 40 mounted in the exhaust manifold, a condenser and heat plate assembly 41 mounted on the inlet manifold, and a heat pipe assembly 42 interconnecting the boiler and condenser units. Also a part of the heating system are the riser assembly 21 and conduit 43 connecting the riser assembly with the condenser assembly 41.

The boiler assembly 40 includes an elongated tubular container 44 made of heat conductive material capable of withstanding maximum exhaust gases such as, for example, stainless steel. The container is closed at the bottom to define internally thereof a fluid tight cavity 45, and extends upwardly through an opening, not shown, in a boss 46 formed in the wall of the exhaust manifold to which the container 44 is secured by a fitting 48. A plurality of heat absorbing fins 49 protrude radially outwardly from the side walls of the container 44 and extend longitudinally thereof along the flow path of exhaust gases through the exhaust manifold passage 36.

The condenser and heat plate assembly 41 includes a thin wall heat plate 50 made of stainless steel or similar heat conductive material resistant to heat and corrosion. The heat plate has a flat central portion 51 disposed within the manifold opening 29 and forming the lower wall of the mixture plenum 15. The central portion 51 connects via a downwardly extending annular section 52 with a radial flange 54 that is retained between insulating rings 55, 56 and is thereby sealingly secured to the mounting flange 30 surrounding manifold opening 29. An additional longitudinally oriented insulating ring 58 is provided surrounding the annular section 52 and separating it from the inner walls of the manifold opening 29.

Secured against the lower insulating ring 55, and included as part of the assembly 41, is a drain cup 59 including an outer flange 60 connecting with generally conical downwardly angled sides 61 that merge into an annular central sump defining section 62. At its center, the drain cup has a nozzle 64 extending upwardly, above the sump 62 toward the flat central portion 51 of the heat plate and defining a central passage 65.

Connected between the open upper end of the boiler assembly 40 and the nozzle 64 of the condenser and heat plate assembly 41 is the heat pipe 42, including an outer conduit 66 formed, for example, of stainless steel and sealingly secured (as by welding to the heat cup and through compression fittings to the boiler assembly) to form a gas tight connection between the boiler cavity 45 and a condenser cavity 68 defined within assembly 41. Within the conduit 66 and extending well into the boiler cavity 45 there is disposed an elongated wick 69 substantially smaller in diameter than the interior of conduit 66. The wick may be made in any suitable manner, but in the present instance is formed by a tightly coiled stainless steel spring which defines internally thereof a small diameter passage capable of generating capillary pressure for transporting liquid therein. The upper end of the wick 69 extends out through a small opening 70 formed in the nozzle 64 just above the bottom of the sump defining section 62 so that the open upper end of the wick connects with the sump in the lower section of the drain cup.

The sump portion 62 of the drain cup is also connected with the lower end of the jacket 27 surrounding the riser tube 25 by means of the conduit 43 which connects by suitable fittings to openings 72, 74 in the drain cup sump 62 and the jacket outer tube 26, respectively. The connection to opening 74 is arranged so that fluid entering the jacket 27 from the conduit 43 is directed in an upwardly spiraling motion around the riser tube 25. Within the sealed system defined within the connecting cavities of the heat pipe and riser system is a predetermined mass of vaporizable heat conducting fluid which may be, for example, water or any one of a number of natural or synthetic fluids having stability and vaporizing temperatures suitable for the application. In addition, the system is initially pressurized with a predetermined mass of inert gas such as, for example, nitrogen or argon.

OPERATION

In operation, the carburetor 28 feeds air-fuel mixture downwardly through riser tube 25 through the plenum 15 and mixture passages 18 of the manifold for delivery to the combustion chambers of the engine 10. Concurrently, exhaust gases leaving the engine are collected by the exhaust manifold and pass out through the exhaust passage 36.

Heat from the exhaust gases is absorbed in fins 49 and carried to the wall of the container 44 where it evaporates liquid therein, forming vapor which flows upwardly through the conduit 66 of heat pipe 42 and through the nozzle passage 65 by which it is directed against the central portion 51 of the heat plate 50. Here, the vapor condenses along the lower surface of the plate 50, transferring heat to the plate, so that it may in turn vaporize droplets of fuel impinging on its upper surface and heat air-fuel mixture adjacent thereto which is passing through the plenum 15 into the horizontal passages of the manifold 11 from the vertical riser tube 25.

When the system is started up from a cold state, the initial vapor temperatures must be sufficiently high to achieve adequate fuel vaporization at the central portion 51 of heat plate 50. This initial vapor temperature is determined by the heat transfer fluid boiling point and that is determined by the fluid physical properties and the pressure of the inert gas contained within the system. For example, when using water as the heat transfer fluid, it was found that the system had to be charged with a 75 psia inert gas pressure (when the system was cold) in order to achieve vapor temperatures of 300° F during system warm-up. Use of heat transfer fluids with boiling temperatures higher than water would require proportionately lower inert gas pressures in order to achieve the initial 300° F vapor temperatures.

The thin wall construction of the heat plate provides a low mass which is easily and quickly heated to operating temperature by the vaporized fluid. Also, its mounting in the end insulating rings 55, 56 and partial enclosure by the annular ring 58 aids in preventing the loss of heat from the plate to the cold manifold walls, accordingly, that the system reaches operating temperature quickly after starting of the engine and provides a high rate of heat transfer to vaporize fuel and heat air-fuel mixture in the inlet manifold.

Upon condensation of the heat conducting fluid on the bottom of plate portion 51, droplets of liquid fall into the drain cup 59 collecting in the sump portion 62. From the sump, the liquid enters the end of wick 69 and is forced downwardly through its internal capillary passage, returning thereby to the boiler cavity 45.

When the rate of heat absorption in the boiler is sufficiently high, the excess vapor not condensed within the condenser cavity 68 passes upwardly through conduit 43 into the riser jacket 27 where it spirals around and heats the walls of the riser tube 25. This vaporizes fuel that collects along the inner surface of the riser tube and aids in forming a completely vaporized air-fuel mixture. As the vapor within the jacket 27 gives up its heat, it is condensed and drops to the bottom of the jacket in position to drain back through conduit 43 to the drain cup sump 62 for return through wick 69 to the boiler cavity 45.

The rate of return flow of the boiler fluid may be controlled by properly sizing or orificing the conduit 43 or either of its connecting openings 72, 74 so as to limit the rate at which condensate can return to the drain cup sump while vapor is passing upwardly from the sump to the riser jacket. Thus, when the rate of heat input to the boiler is high, the upward flow of vapor causes condensate to collect within the riser jacket 27. This continues until the fluid in the boiler is exhausted or at least reduced to the point where the rate of condensation on the heat plate 51 almost equals the rate of vaporization of liquid in the boiler. At this point, the upward flow of vapor to the riser jacket 27 is reduced nearly to zero, permitting condensate to drain downwardly to the conduit 71 for return to the boiler.

This action provides a control on the heat transferred by and pressure developed within the heat pipe system, by maintaining out of the vaporization cycle some of the liquid within the system whenever the rate of heat transfer becomes excessive. This controls the amount of the liquid which may be vaporized at any one time, thus maintaining a predetermined maximum pressure and temperature limit within the heat pipe and thereby at the walls of the heat plate 50 and riser tube 25. It should be understood that similar control of heat pipe condensate flow, pressure and temperature may be obtained by using a separate storage tank connected with the drain cup sump, instead of the carburetor riser in systems where use of such a riser is not practical or desired.

In a specific application to a 140 cubic inch displacement four cylinder internal combustion engine, a heat pipe system using 20 cubic centimeters of water (20 grams mass) as a heat transfer fluid was found to be capable of generating about 4 kilowatts of heat flow to the air-fuel mixture. In this arrangement, substantially as shown in FIGS. 1–4, the inner diameter of the heat pipe was approximately 8.7 mm, while the spring wick had an outer diameter of 3.2 mm and an inner diameter of about 2.2 mm. The material of the heat plate was stainless steel, and it had an area of 42 sq. cm. and a mass of 34 grams.

ALTERNATIVE EMBODIMENTS

Figure 6:
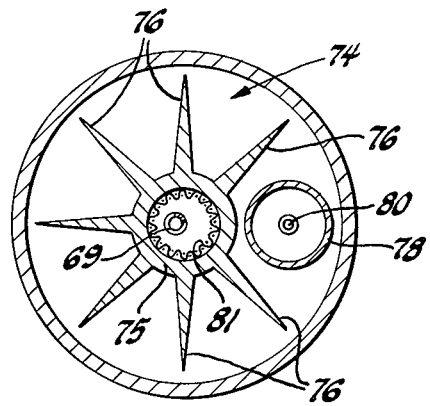
FIG. 6 is a cross-sectional view through the boiler and tank of FIG. 5 looking upwardly from the plane of the line 6—6 of FIG. 5.

FIGS. 5 and 6 disclose an alternative embodiment of boiler construction for a heat pipe system otherwise like that of FIGS. 1–4. In this arrangement the boiler assembly 74 includes an elongated container 75 having a plurality of longitudinal fins 76 attached thereto. Adjacent the container and extending longitudinally therealong, between two of the fins 76 is a tubular tank 78 which is connected at its ends by small conduits 79 and 80 to the interior of the container 75 at the bottom and top of the main boiler sections, respectively. Tank 78 contains a substantial volume, preferably over half, of the liquid heat transfer fluid contained in the boiler assembly and thus reduces the amount of liquid actually contained within the boiler container itself. The inner surfaces of the container are provided with a wick material 81 which may be stainless steel, wire mesh or other suitable porous material. The wick conducts liquid upwardly along the walls of the container for the vaporization process to take place above normal liquid level.

The reduction of the volume of liquid within the boiler container permits the boiler to more quickly reach its operating temperature and begin vaporizing liquid both from the wick and along the walls below the liquid level, since the volume of liquid which must be heated is less than would be the case if all the liquid were stored within the boiler itself. As liquid in the boiler container is vaporized and flows upwardly in the heat pipe system, additional liquid is transferred by gravity from the storage tank 78 into the boiler cavity and upwardly along the walls thereof by the wick 81.

Figure 7:
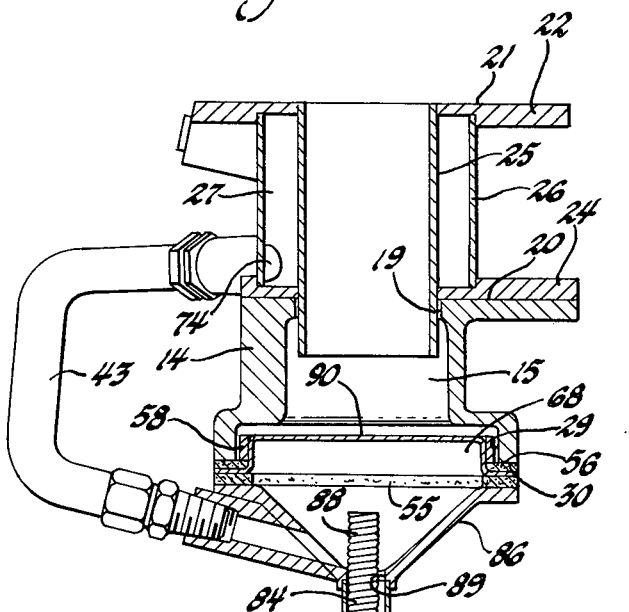
FIG. 7 is an enlarged cross-sectional view similar to FIG. 4, but showing an alternative construction of heat pipe utilizing a different form of wick.
Figure 8:
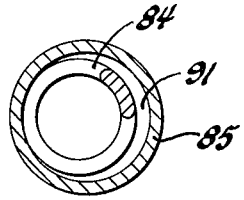
FIG. 8 is a cross-sectional view through the heat pipe of FIG. 7 showing the wick arrangement in greater detail.

FIGS. 7 and 8 show an alternative embodiment wherein the small artery type wick used in the embodiments of FIGS. 1–6 is replaced by a relatively large diameter wick 84 formed, again in this case, by a tightly coiled steel spring. In this construction the wick 84 defines the vapor passage on its interior, while the condensate return passage is formed between the exterior of the wick and the walls of the surrounding conduit 85. Thus in this construction, the drain cup 86 does not include a nozzle, but rather a nozzle 88 is formed by an extension of the wick 84 above the opening 89 in the bottom of the drain cup through which the wick extends. Vapor is directed upwardly against the heat plate 90 by the wick nozzle 88, and condensate collecting in the bottom of the heat cup flows naturally into the clearance space 91 between the wick 84 and conduit 85.

Since the wick naturally lays along one side of the tube in somewhat of a random fashion, the clearance space 91 takes the form of a crescent annulus, being relatively large on one side and disappearing to zero thickness on the opposite side. For this reason, this form of wick construction is denominated a crescent annulus wick. The crescent annulus wick has the capability of pumping greater volumes of liquid with a higher capillary force than the artery wick arrangement, due to the larger area for liquid flow provided in conjunction with a narrow capillary passage.

It should be understood that the invention is not limited to the types of wicks or other specific features disclosed and that various other constructions of heat pipes, boilers, condensors and the like applicable to the inventive concepts disclosed, could be utilized without departing from the basic teachings of the invention. Accordingly, the invention is not intended to be limited except by the language of the following claims.

What is claimed is:

1. In combination with an internal combustion engine
an intake manifold having a generally horizontal inlet mixture passage and means for mounting a carburetor on said manifold above said passage, said mounting means defining an inlet opening in an upper portion of said passage,
an exhaust manifold having an exhaust gas passage extending to a level below said inlet manifold passage and
heat pipe means for transferring heat between said exhaust passage and said inlet passage, said heat pipe means comprising
a boiler in said exhaust passage and including an elongated container formed of heat conductive material capable of withstanding maximum exhaust gas temperatures, said container extending generally lengthwise of said exhaust passage and having a plurality of heat absorbing fins along the outer surface thereof and extending generally along the line of gas flow within said exhaust passage,
a heat plate mounted in said manifold and forming a portion of the bottom wall of said inlet passage opposite the position of said inlet opening so as to intercept fuel droplets entering said inlet passage through said opening, said heat plate being formed of thin heat conductive material of low mass and secured in an opening in the wall of said manifold passage by means which limit the transfer of heat from said heat plate directly to the manifold walls,
a drain cup sealingly secured to and extending below said heat plate, said drain cup having downwardly angled walls converging at a low point having an opening,
a tubular heat pipe conduit extending between said boiler and said drain cup opening and sealingly secured thereto to provide a sealed passage between said container and the interior of said drain cup below said heat plate,
a limited mass of vaporizable heat transfer fluid within said sealed passage and its connected volumes, a mass of inert gas within and pressuring said sealed passage and its connected volumes to establish a predetermined range of vaporization temperatures for said heat transfer fluid,
wick means extending within said tubular conduit and into said container and adapted to separate the interior thereof into two flow paths comprising a larger path for the flow of vapor upwardly from said boiler to said drain cup and a smaller capillary path for the downward flow of liquid from said drain cup to said boiler, and
a nozzle extending upwardly from said drain cup opening to carry upward flowing vapor above the level of liquid condensate in said drain cup and direct such vapor against the lower surface of said hot plate.

2. The combination of claim 1 wherein said wick means defines a small arterial passage within said tubular conduit, the upper end of said conduit extending through an opening in said nozzle and connecting with said drain cup lower portion to receive condensate therefrom.

3. The combination of claim 1 wherein said wick means comprises a capillary walled conduit sized smaller than the interior diameter of said tubular conduit and extending in random engagement with the walls of said conduit to define a larger vapor flow passage within said wick element and a crescent shaped capillary flow passage between said wick element and said tubular conduit, said nozzle comprising an extension of said wick element above the level of said drain cup opening.

4. The combination of claim 1 wherein said boiler further includes an elongated storage tank extending along one side of said elongated container within said exhaust passage, said storage tank being connected with said container at its upper and lower ends through liquid conduit means of small mass, whereby said tank provides storage means for liquid condensate outside of said container substantially reducing the volume of liquid within said container so as to permit faster warm-up and boiling of the liquid upon initial heating of the boiler assembly by exhaust gases.

5. In combination with an internal combustion engine
an intake manifold having a generally horizontal inlet mixture passage and means for mounting a carburetor on said manifold above said passage, said mounting means defining an inlet opening in an upper portion of said passage,
an exhaust manifold having an exhaust gas passage extending to a level below said inlet manifold passage and
heat pipe means for transferring heat between said exhaust passage and said inlet passage, said heat pipe means comprising
a boiler in said exhaust passage and including an elongated container formed of heat conductive material capable of withstanding maximum exhaust gas temperatures, said container extending generally lengthwise of said exhaust passage and having a plurality of heat absorbing fins along the outer surface thereof and extending generally along the line of gas flow within said exhaust passage,
a heat plate mounted in said manifold and forming a portion of the bottom wall of said inlet passage opposite the position of said inlet opening so as to intercept fuel droplets entering said inlet passage through said opening, said heat plate being formed of thin heat conductive material of low mass and secured in an opening in the wall of said manifold passage by means which limit the transfer of heat from said heat plate directly to the manifold walls,
a drain cup sealingly secured to and extending below said heat plate, said drain cup having downwardly angled walls converging at a low point having an opening,
a tubular heat pipe conduit extending between said boiler and said drain cup opening and sealingly secured thereto to provide a sealed passage between said container and the interior of said drain cup below said heat plate,
a limited mass of vaporizable fluid within said sealed passage and its connected volumes, a mass of inert gas within and pressurizing said sealed passage and its connected volumes to establish a predetermined range of vaporization temperatures for said heat transfer fluid, wick means extending within said tubular conduit and into said container and adapted to separate the interior thereof into two flow paths comprising a larger path for the flow of vapor upwardly from said boiler to said drain cup and a smaller capillary path for the downward flow of liquid from said drain cup to said boiler, and a nozzle extending upwardly from said drain cup opening to carry upward flowing vapor above the level of liquid condensate in said drain cup and direct such vapor against the lower surface of said hot plate a tubular riser formed of minimum mass heat conductive material and extending upwardly from said intake manifold passage upper opening to a carburetor mounting boss spaced above said manifold, means defining an annular vapor jacket surrounding said tubular riser and conduit means connecting the lower portion of said riser vapor jacket with the lower portion of said drain cup to provide a flow path for the passage of vapor upwardly from said drain cup to said vapor jacket and condensate downwardly from said vapor jacket to said drain cup, said conduit flow path being restricted so as to limit the flow of returning condensate when the upward flow of vapor exceeds a desired maximum flow, said conduit thereby acting to limit the heat output of said boiler by limiting the rate of condensate return thereto so as to thereby control the operating temperatures and pressures of said heat pipe means below a predetermined maximum.

* * * * *